(12) United States Patent
Colasanta et al.

(10) Patent No.: US 11,247,650 B2
(45) Date of Patent: Feb. 15, 2022

(54) BRAKE DEVICE FOR A HYDRAULIC MOTOR VEHICLE BRAKE SYSTEM

(71) Applicant: Continental Teves AG & Co. oHG, Frankfurt am Main (DE)

(72) Inventors: Jefferson Colasanta, Hofheim am Taunus (DE); Thomas Sellinger, Dreieich (DE); Manfred Rüffer, Sulzbach (DE); Horst Krämer, Ginsheim-Gustavsburg (DE)

(73) Assignee: Continental Teves AG & Co. oHG

( * ) Notice: Subject to any disclaimer, the term of this patent is extended or adjusted under 35 U.S.C. 154(b) by 32 days.

(21) Appl. No.: 16/330,135

(22) PCT Filed: Aug. 16, 2017

(86) PCT No.: PCT/EP2017/070753
§ 371 (c)(1),
(2) Date: Mar. 4, 2019

(87) PCT Pub. No.: WO2018/046262
PCT Pub. Date: Mar. 15, 2018

(65) Prior Publication Data
US 2019/0225204 A1    Jul. 25, 2019

(30) Foreign Application Priority Data

Sep. 6, 2016  (DE) .................. 10 2016 216 854.1
Sep. 21, 2016 (DE) .................. 10 2016 218 183.1

(51) Int. Cl.
*B60T 11/18*  (2006.01)
*B60T 7/04*   (2006.01)
(52) U.S. Cl.
CPC ............... *B60T 11/18* (2013.01); *B60T 7/04* (2013.01)

(58) Field of Classification Search
CPC . B60T 7/04; B60T 7/045; B60T 7/122; B60T 11/18
See application file for complete search history.

(56) References Cited

U.S. PATENT DOCUMENTS 3,107,111 A * 10/1963 Hager ................. F16C 11/0619
                                                       403/365
3,173,344 A *  3/1965 Mongitore .............. F16J 1/22
                                                        92/187
(Continued)

FOREIGN PATENT DOCUMENTS

DE       4232807 A1     8/1993
DE      69113363 T2     2/1996
(Continued)

OTHER PUBLICATIONS

German Search Report for German Application No. 10 2016 218 183.1, dated Jul. 26, 2017 with partial translation—10 pages.
(Continued)

*Primary Examiner* — Robert A. Siconolfi
*Assistant Examiner* — Mahbubur Rashid
(74) *Attorney, Agent, or Firm* — RatnerPrestia (57) ABSTRACT

A brake device for a hydraulic motor vehicle brake system, having a housing, at least one pressure chamber arranged in the housing, filled with a hydraulic pressure medium and bounded by at least one cylinder piston moveable in an axial direction to generate brake pressure. The cylinder piston can be activated mechanically with an activation force by an activation rod unit which is secured to the cylinder piston. In order to provide an improved brake device which is of the generic type mentioned at the beginning and permit a secure connection between the activation rod and the cylinder piston and at the same time mounting which is as easy as possible, it is proposed that the activation rod unit is secured to the cylinder piston by a latching connection, wherein the
(Continued)

latching connection is brought about by an axial relative movement between the activation rod unit and the cylinder piston.

17 Claims, 7 Drawing Sheets

(56) References Cited

U.S. PATENT DOCUMENTS

| | | | | |
|---|---|---|---|---|
| 3,787,128 | A * | 1/1974 | Maistrelli | F16C 11/069 403/135 |
| 4,650,363 | A * | 3/1987 | Kehl | B60T 13/567 403/135 |
| 4,758,110 | A * | 7/1988 | Ito | F16C 11/0638 403/122 |
| 4,831,916 | A * | 5/1989 | Leigh-Monstevens | F15B 7/08 92/129 |
| 4,878,346 | A * | 11/1989 | Metzelfeld | B60T 11/16 60/588 |
| 4,924,673 | A * | 5/1990 | Barker | B60T 11/22 60/585 |
| 5,143,469 | A | 9/1992 | Cadeddu | |
| 5,163,773 | A | 11/1992 | Denney et al. | |
| 5,335,585 | A * | 8/1994 | Fischenich | B60T 11/16 92/128 |
| 5,499,570 | A | 3/1996 | Bergelin et al. | |
| 5,735,188 | A * | 4/1998 | Nix | F16D 25/12 92/129 |
| 5,794,512 | A * | 8/1998 | Prosch | B60K 23/02 92/128 |
| 5,934,151 | A | 8/1999 | Carr et al. | |
| 6,336,329 | B1 * | 1/2002 | Adler | B60T 11/16 60/588 |
| 6,446,436 | B1 * | 9/2002 | Winkelmann | B60T 11/165 60/533 |
| 6,485,218 | B1 * | 11/2002 | Martinovsky | B60T 13/52 403/135 |
| 6,581,380 | B2 * | 6/2003 | Dangel | F16D 25/088 60/588 |
| 6,813,991 | B2 | 11/2004 | Köth | |
| 6,899,016 | B2 * | 5/2005 | Gemeinhardt | F16C 11/0638 403/122 |
| 7,047,868 | B2 * | 5/2006 | Nolan | B60T 11/165 60/533 |
| 7,056,125 | B2 * | 6/2006 | Melis | F16C 11/0619 403/365 |
| 7,188,563 | B2 * | 3/2007 | Liebig | F16D 23/12 60/453 |
| 7,441,478 | B2 | 10/2008 | Burgstaler et al. | |
| 7,493,849 | B2 * | 2/2009 | Macht | F16D 23/12 60/453 |
| 8,850,955 | B2 * | 10/2014 | Isakson | F16C 11/0638 92/187 |
| 9,140,294 | B2 * | 9/2015 | Burton | B60T 11/22 60/585 |
| 2004/0069578 | A1 * | 4/2004 | Koth | B60T 11/18 188/152 |
| 2605/0166753 | | 8/2005 | Nolan et al. | |
| 2006/0118375 | A1 | 6/2006 | Macht et al. | |

FOREIGN PATENT DOCUMENTS

| | | |
|---|---|---|
| DE | 10110931 C1 | 2/2003 |
| DE | 102010049866 A1 | 5/2012 |
| EP | 0469947 A1 | 2/1992 |
| EP | 0896162 A1 | 2/1999 |
| EP | 1431596 A1 | 6/2004 |
| GB | 2235961 A | 3/1991 |
| JP | 2015080986 A | 4/2015 |
| JP | 2016013721 A | 1/2016 |
| KR | 20010015676 A | 2/2001 |
| KR | 20110109520 A | 10/2011 |
| WO | 9315942 A1 | 8/1993 |
| WO | 02070314 A1 | 9/2002 |
| WO | 2005002937 A1 | 1/2005 |

OTHER PUBLICATIONS

International Search Report and Written Opinion for International Application No. PCT/EP2017/070753, dated Nov. 22, 2017—8 pages.
Korean Notice of Grounds for Rejection for Korean Application No. 10-2019-7008846, dated Feb. 17, 2020 with translation, 16 pages.
Chinese Office Action for Chinese Application No. 201780054419.7, dated Sep. 24, 2020, with translation, 15 pages.
Japanese Notice of Reasons for Refusal for Japanese Application No. 2019-512833, dated Jul. 30, 2021 with translation, 26 pages.
Chinese Office Action for Chinese Application No. 201780054419.7, dated Jul. 21, 2021 with translation, 13 pages.

* cited by examiner

BRAKE DEVICE FOR A HYDRAULIC MOTOR VEHICLE BRAKE SYSTEM

CROSS REFERENCE TO RELATED APPLICATIONS

This application is the U.S. National Phase Application of PCT International Patent Application No. PCT/EP2017/070753, filed Aug. 16, 2017, which claims priority to German Patent Application No. 10 2016 216 854.1, filed Sep. 6, 2016, and German Patent Application No. 10 2016 218 183.1, filed Sep. 21, 2016, the contents of such applications being incorporated by reference herein.

FIELD OF THE INVENTION

The invention relates to a brake device for a hydraulic motor vehicle brake system.

BACKGROUND OF THE INVENTION

It is known to use, for hydraulic brake systems in motor vehicles, brake devices which have a master brake cylinder with a cylinder piston which can be moved linearly in order to generate brake pressure and which is connected in a force-transmitting connection by means of an activation rod which is mechanically coupled to a brake pedal. In this context, at the same time it is necessary to implement a reliable connection of the activation rod to the piston and to the brake pedal, angle compensation between the components during operation, simple mounting and continuous low-noise operation. Increasing use is being made of brake devices which can be remote-controlled electronically and have integrated electrohydraulic or electromechanical booster stages, and also of pressure modulation stages, which are aimed at achieving a compact design and are configured for rapid dynamic braking processes. As a result, in particular a secure connection of the activation rod to the cylinder piston with effective transmission of traction forces and compression forces is important.

It is known, for example, to press or crimp an activation rod provided with a spherical head for the purpose of angle compensation, in a separate attachment and to caulk this attachment non-detachably in the cylinder piston. In order to permit here the coupling of the activation rod to the brake pedal which is mounted in the passenger compartment of the vehicle and the mounting of the brake device in the engine compartment, the activation rod must be configured in two pieces, or the interface thereof with the brake pedal must be made particularly complex.

SUMMARY OF THE INVENTION

An aspect of the invention is an improved brake device which is of the generic type mentioned at the beginning and permits a secure connection between the activation rod and the cylinder piston and at the same time mounting in the vehicle which is as easy as possible, while avoiding the above-mentioned disadvantages.

An aspect of the invention provides that the activation rod unit is secured to the cylinder piston by means of a latching connection, wherein the latching connection is brought about only by means of an axial relative movement between the activation rod unit and the cylinder piston. Therefore, the mounting is considerably simplified, a plurality of process steps such as the pressing in of damping disks or adapter fittings, the caulking of the piston rod in the cylinder piston and, if appropriate, the screwing of the piston rod to the fork head for the purpose of coupling the brake pedal can be dispensed with.

According to one development of an aspect of the invention, the activation rod unit which is latched to the cylinder piston is provided such that it can be moved to a limited degree in the axial direction relative to the cylinder piston, as a result of which the latching connection can be reliably reproduced in a particularly easy fashion and can be carried out in an audibly perceptible fashion, which reduces tolerance requirements and expenditure on testing.

An aspect of the invention likewise provides that the activation rod unit has a single-piece activation rod to whose cylinder-piston-side end a separate fastening part, which is provided for transmitting force from the activation rod into the cylinder piston in both axial directions, is secured. According to a further preferred development, the fastening part has at least one latching projection which interacts with an axial stop on the cylinder piston. As a result, the use of the activation rod unit can be initiated as a prefabricated assembly once the final mounting of the brake device in the vehicle is completed, and can considerably reduce the expenditure for the final mounting. As a result of the single-piece activation rod, the necessary functional dimensions can be complied with more easily, and the expenditure on calibration and checking can be reduced.

According to one particularly preferred embodiment according to an aspect of the invention, the end face, axially facing the latching projection, of the stop on the cylinder piston, is embodied in an oblique or rounded fashion such that the stop has a radial undercut. As a result, the corresponding contact faces can be made to interact in such a way that when there is axially directed pressure against the stop, a radially outwardly acting force component is applied and shifted to the latching projection. As a result, the fastening part is effectively prevented from slipping out even during particularly high-dynamic braking processes, functionally advantageous self-centering is brought about, and the weight can be reduced.

According to one advantageous embodiment according to an aspect of the invention, the fastening part is embodied in two pieces and has a pressure part, which is provided for transmitting the activation force from the activation rod into the cylinder piston, and a latching part, which is connected to the pressure part and has at least one latching projection for latching in the cylinder piston. The two parts can as a result be manufactured selectively from the materials which are respectively particularly suitable for the various load scenarios.

One particularly advantageous embodiment provides that the latching part is constructed from a thermoplastic material, which also permits particularly complex shapes to be manufactured easily and cost-effectively by means of injection molding.

Preferably, the fastening part 6 has at least 3 latching projections arranged distributed over the circumference, and which permit spatially defined stable bearing and support for the transmission of force to be achieved.

According to a further advantageous embodiment, the latching projection is formed in each case at a first free end of a spring arm whose second end is joined to the fastening part, permitting a sufficient degree of elastic deformation to be achieved without a large application of force even when particularly solid materials are used.

An aspect of the invention also provides that in its unactivated home position the cylinder piston is supported axially against the housing by the fastening part, which can further simplify the mounting.

For this, one preferred embodiment of an aspect of the invention provides that the fastening part has, at its end facing away from the cylinder piston, a supporting ring which is provided for applying axial forces from the cylinder piston into the housing.

In order to simplify the mounting further, an aspect of the invention provides that the activation rod has a radial shoulder, by which a restoring force which is generated in a restoring spring is applied to the activation rod in order to axially shift the activation rod unit into an unbraked home position, and according to one preferred embodiment the restoring force is applied to the radial shoulder via a supporting element which is arranged guided in an axially movable fashion on the activation rod.

According to a further preferred embodiment according to an aspect of the invention the brake device for generating braking force interacts with at least one electromechanical or electrohydraulic booster stage or is integrated into a booster stage. As a result, the brake device can be offered as an easy-to-mount, space-saving functional module which combines all the essential braking functions in a single assembly.

BRIEF DESCRIPTION OF THE DRAWINGS

Further features and advantages of aspects of the invention will emerge from the following description of an exemplary embodiment according to an aspect of the invention. In the appended drawings:

FIGS. 4-7 show views of details according to FIG. 3 in the unactivated release position FIG. 4), during an activation process (FIG. 5), in the return movement (FIGS. 6A and 6B) and the subsequent position of rest (FIG. 7)

DETAILED DESCRIPTION OF THE PREFERRED EMBODIMENTS

Figure 1A:
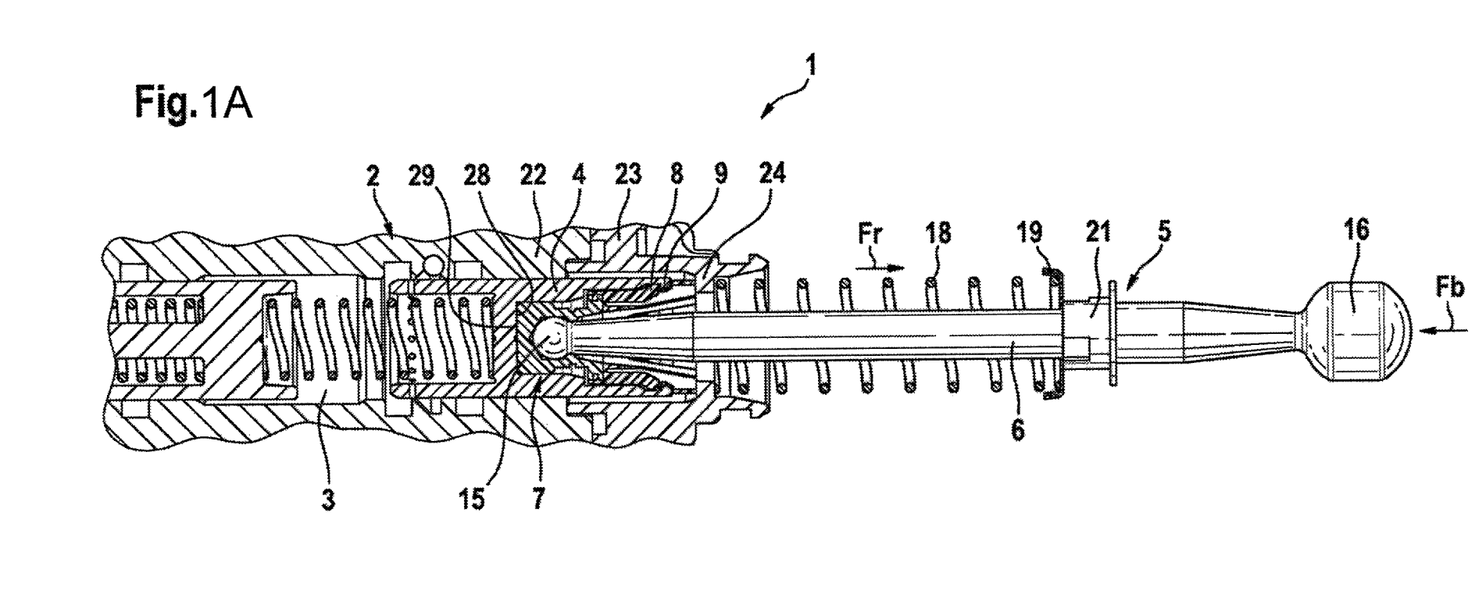
FIGS. 1A and 1B show a partial view of a first embodiment of the improved brake device according to an aspect of the invention with the coupled activation rod in a longitudinal section (FIG. 1A) and a known, disadvantageous design of the interface between the activation rod in the cylinder piston (FIG. 1B)
Figure 1B:
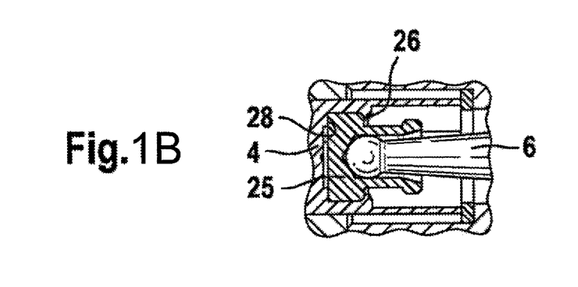

FIG. 1

FIG. 1A illustrates a detail of an embodiment of the brake device 1 according to an aspect of the invention for a hydraulic motor vehicle brake system.

The brake device 1 has a housing 2 which has a body 22 and a rear part 23 which are joined to one another by means of a traction-force-transmitting and compression-force-transmitting connection, which connection is implemented, for example, by means of screw elements (not shown).

A pressure chamber 3 which is filled with a hydraulic pressure medium, is connected to a simulator (not shown) and is bounded by a cylinder piston 4 arranged in the body 22. In order to generate braking pressure in the pressure chamber 3, the cylinder piston 4 can be shifted from its unactivated home position (illustrated here) axially in the direction of the pressure chamber 3. The activation of the cylinder piston 4 is carried out with an activation force Fb by means of an activation rod unit 5 which is secured thereto and is mechanically coupled, at its end facing away from the cylinder piston 4, to a brake pedal (not shown here).

The activation rod unit 5 has a single-piece activation rod 6. In the embodiment shown the activation rod 6 is provided with a spherical head 15, 16 at each of its two ends in order to compensate for angles between the essentially longitudinal axis-parallel, linear movement of the cylinder piston 4 and the not necessarily longitudinal-axis of parallel movement of the activation rod unit 5 and in order to compensate for installation tolerances.

In order to reset the activation rod unit 5 into its unactivated home a position, a restoring spring 18 is provided which is clamped in between the housing 2 or its rear part 23 and a supporting part 19 which is axially supported on the activation rod 6.

In a blind drilled hole 28 in the cylinder piston 4, a fastening part 7 is accommodated in which the activation rod 6 is secured, in such way that it can tilt to a limited degree, by its cylinder-piston-side spherical head 15.

An axial stop 9, which is provided on the activation-rod-side edge of the cylinder piston 4, serves to axially secure the fastening part 7, and therefore also the activation rod unit 5, to the cylinder piston 4. For simple mounting, a plurality of latching projections 8, preferably 3 or 6 thereof, are provided arranged distributed over the circumference on the fastening part 7. In order to join the cylinder piston 4 and the activation rod unit 6, the fastening part 7 must merely be simply inserted axially into the blind drilled hole 28. In this context, the latching projections 8 are pressed radially inward in an elastic manner by means of the stop 9 and snap in automatically after passing the stop 9.

The fastening part 7 is as a result configured to transmit forces between the activation rod 6 and the cylinder piston 4, both in the radial and in the two axial directions. Axial forces which act in the direction of the activation force Fb are transmitted into the base of the blind drilled hole 28 via the cylinder-piston-side end side 29 of the fastening part 7 which applies opposing axial forces from the fastening part 7 into the stop 9 via the latching projections 8.

In contrast, a known attachment form of an activation rod 6 in the cylinder piston 4 is shown in FIG. 1B. On the piston side, an adapter 25, which is caulked in the cylinder piston 4, is attached to the activation rod 6. For this, an edge region 26 of the blind drilled hole 28 has to be shaped with a separate tool, as a result of which a non-detachable unit is formed from the cylinder piston 4 and the activation rod 6, which unit impedes the mounting of the cylinder piston 4 in the housing 2 and the mounting of the brake device 1 in the vehicle.

Figure 2:
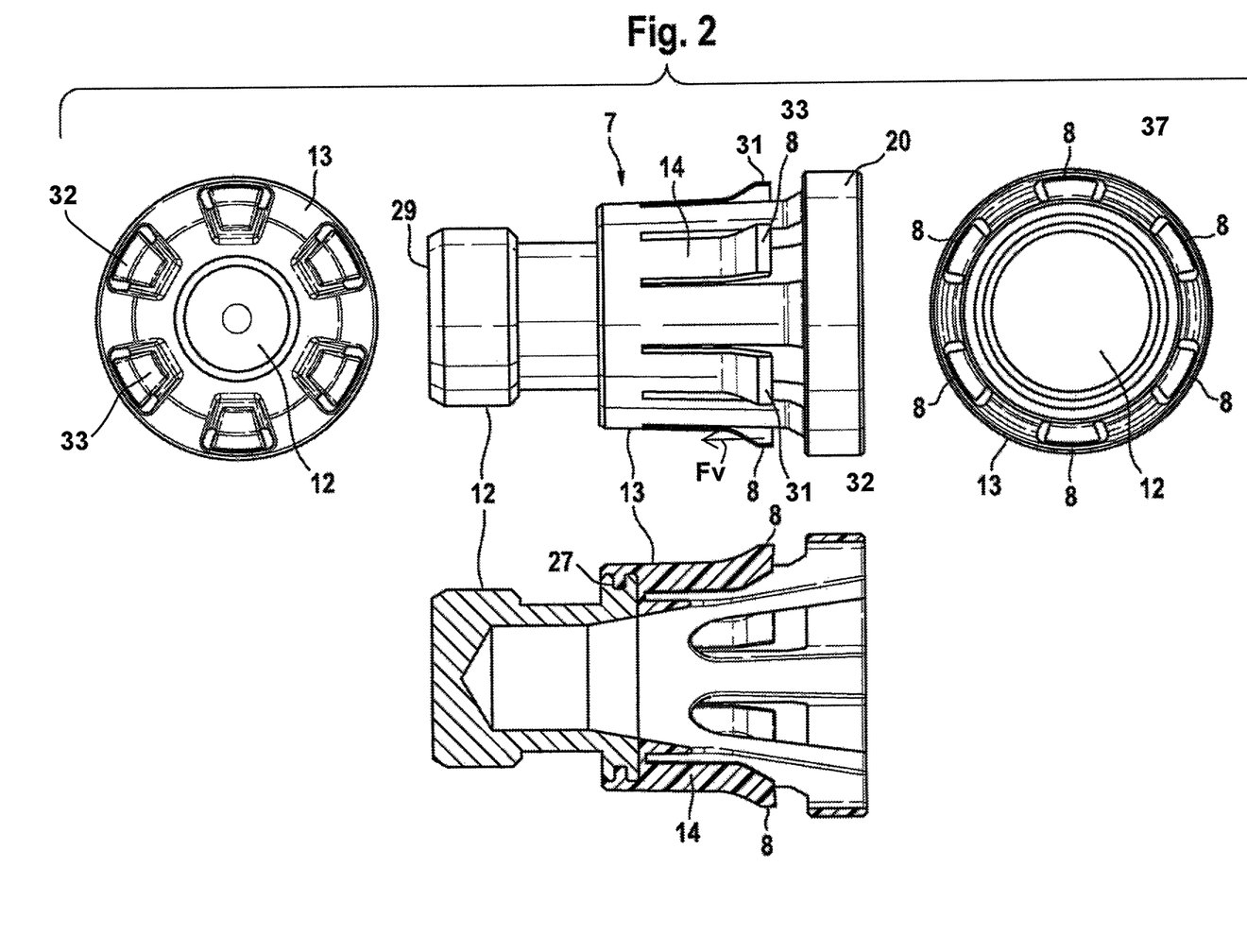
FIG. 2 shows an embodiment of the fastening part according to an aspect of the invention.

FIG. 2

FIG. 2 is an enlarged illustration of an embodiment of the fastening part 7 in accordance with the embodiment according to FIG. 1A.

In the embodiment shown, the fastening part 7 is constructed in two pieces, in order to assign materials with optimum properties easily and in a selective fashion to the different functional areas.

In order to receive the spherical head 15 of the activation rod 6 and transmit the activation forces into the cylinder piston 4, a pressure part 12 is provided which is fabricated from a comparatively more pressure-resistant and permanently dimensionally stable material, preferably steel. The pressure part 12 is preferably connected via a connecting point 27, embodied as a positively locking connection or a combined positively locking and materially joined connection, to a latching part 13 on which the elastically sprung latching projections 8 are formed. The latching part 13 is preferably manufactured as an injection molded part by encapsulating the pressure part 12 by injection molding, from a thermoplastic which is sufficiently elastic for the latching process.

Figure 3:
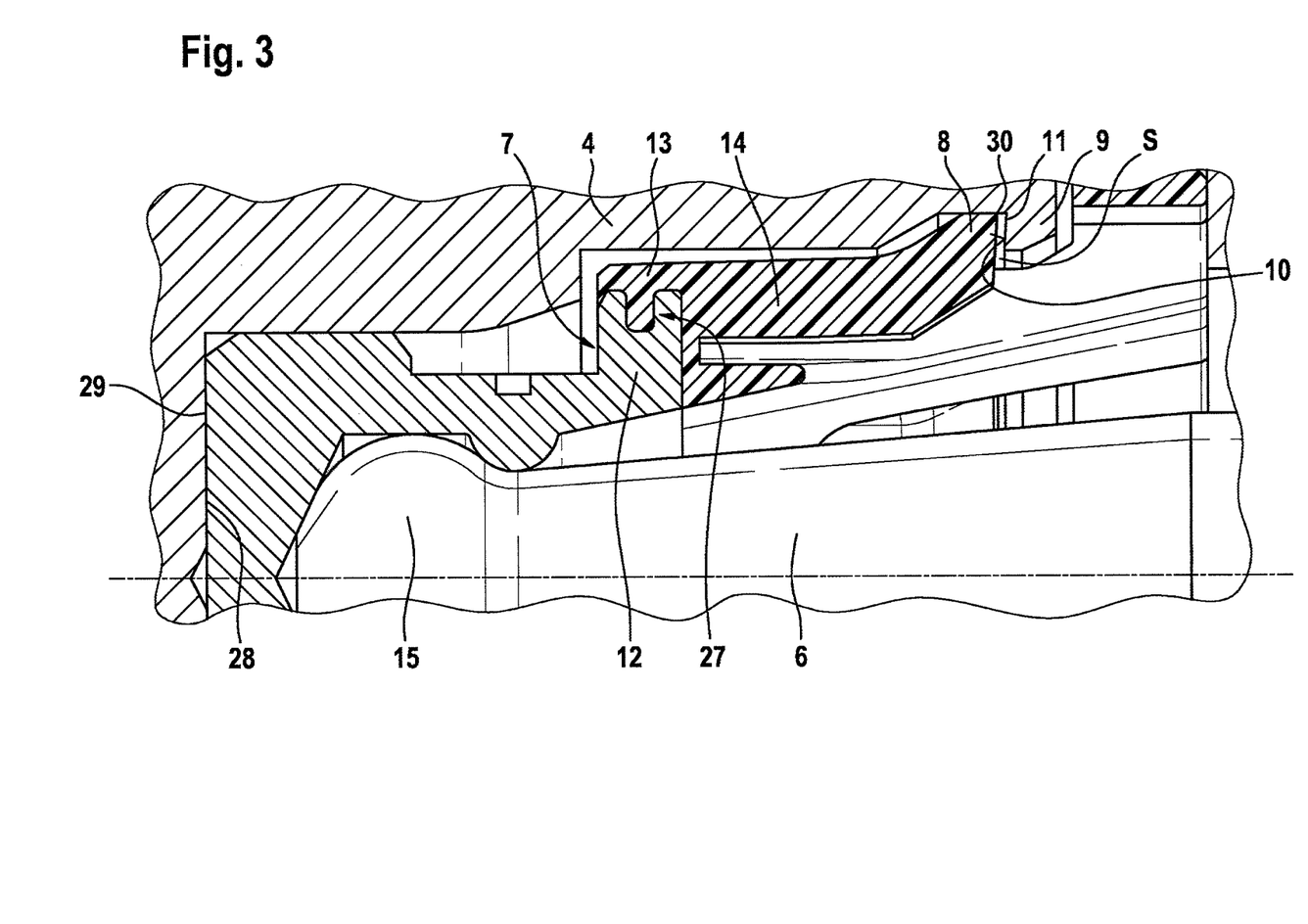
FIG. 3 shows an enlarged view of a detail of the interface between the activation rod unit and the cylinder piston according to the embodiment according to FIG. 1A in a longitudinal section.

During the pre-mounting, the activation rod 6 is inserted into the fastening part 7, and is crimped behind the spherical head 15 in the pressure part 12, as can be seen in FIG. 3.

For spatially defined, stable and sufficiently rigid support, at least 3 latching projections 8 which are arranged distributed over the circumference are provided on the fastening part 7. Each latching projection 8 is formed as a radial projection at a first free end of a spring arm 14 whose second end is joined to the fastening part 7. The rear cut-in face 32, directed toward the stop 9, of each latching projection 8 is, when considered radially from the inside to the outside, formed tilted rearward or counter to the activation force Fb, with the result that when abutment occurs against the stop 9 the latching projection 8 is pressed radially outward and is directed into the undercut 11.

On the fastening part 7, clamping projections 31 are provided in the circumferential direction, alternating with the latching projections 8 described above. Each clamping projection 31 is also embodied as a radial projection on a first free end of the spring arm 14. In contrast to the latching projection 8, the clamping projection 31 has at the rear, directed toward the stop 9, sliding face 33 which is formed tilted radially forward or in the direction of the activation force Fb, when viewed radially from the inside to the outside. As a result, when abutment occurs against the stop 9 the clamping projection 31 is pressed radially inward with the building up or increasing of an advancing force Fv (see FIG. 6B) which is directed in the direction of the activation force Fb.

In this context, in the direction counter to the activation force Fb the clamping projections 31 are made axially slightly longer in the axial direction than the latching projections 8.

As a result, in the installed state the sliding faces 33 always bear against stop 9. In particular, the fastening part 7 is prevented from being able to move in an axially uncontrolled fashion in the cylinder piston 4 and therefore prevented from rattling. In the installed state, in each operating state and at any time, the advancing force Fv attempts to advance the fastening part 7 together with the activation rod 5 in the direction Fb and to bring about or maintain the contact of the inside 29 with the cylinder piston 4. However, the fastening part 7 in the cylinder piston 4 continues to be movable to a limited degree in the axial direction relative to the cylinder piston 4 when it is loaded with an opposing force greater than Fv.

At the activation-rod-side end of the fastening part 7, a supporting ring 20 is formed spaced apart axially with respect to the latching projections 8, said supporting ring 20 serving to axially support the cylinder piston 4 in its unactivated home position in the housing 2. Details will be given below on the functioning of the supporting ring 20, in particular in the description relating to FIG. 8.

FIG. 3

In FIG. 3, the position of the fastening part 7 and of the adjoining components is illustrated in the unbraked home position according to FIG. 1A. The embodiment of the stop 9 and that of the corresponding region of the latching projection 8 are particularly noteworthy here. The end face 10, axially facing the latching projection 8, of the stop 9 is embodied obliquely or conically, with the result that the stop has a radial undercut 11. A rounded contour is also possible here. The contact face, corresponding to the end face 10, on the latching projection 8 is also made oblique, possibly parallel with the contour of the end face 10. By virtue of such a configuration, when there is axially directed pressure against the stop 9, a radial force component is applied to the latching projections 8 and they are moved radially outward. As a result, at the same time a forced centering of the fastening part 7 in the cylinder piston 4 and anchoring of the latching projections 8 in the undercut 11, in the manner of a hook, is brought about. This anchoring effect is directly proportional to the acting axial force, as a result of which the fastening part 7 is prevented from slipping out of the cylinder piston 4, even under large forces.

In order to permit the fastening part 7 to latch in the cylinder piston 4 during the mounting, the rear edge 30 of the latching projection 8 must be able to move past the stop 9. For this purpose, the axial distance between the rear edge 30 of the latching projection 8 on the front end side 29 of the fastening part 7 is provided to be smaller than the axial distance between the blind drilled hole 28 and the stop 9, as a result of which, after the latching in the cylinder piston 4, the activation rod unit 5 continues to be slightly axially movable with respect to the latter, with the building up of an advancing force Fv which is directed in the direction of the activation force Fb (see FIG. 6B).

Figure 4:
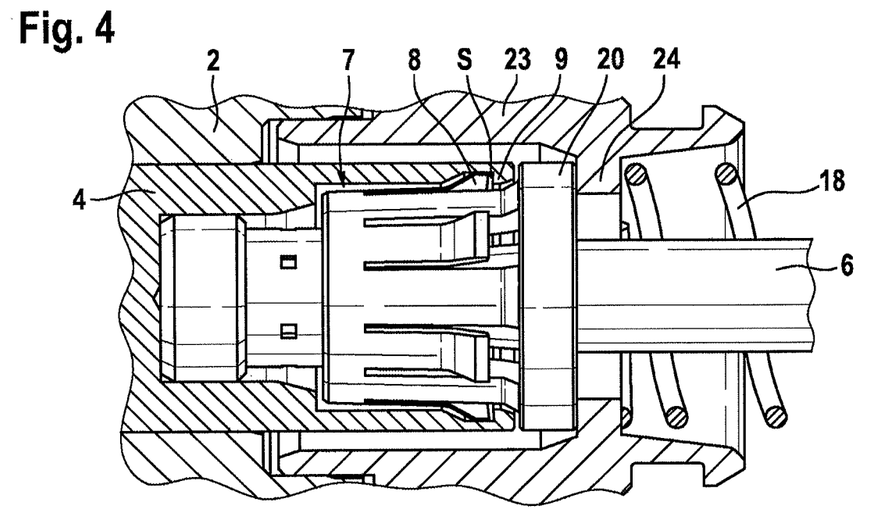

FIG. 4

FIG. 4 illustrates the relative position of the fastening part 7 when the cylinder piston 4 is in its unactivated home position or position of rest. The forces acting on the cylinder piston 4 from the direction of the pressure chamber 3 are applied, together with the restoring force Fr, to the fastening part 7, and the latter is supported axially by means of the supporting ring 20 against the supporting stop 24 arranged on the rear part 23, as a result of which the forces from the cylinder piston 4 are applied to the housing 2, and the position of the cylinder piston 4 is defined. In addition, the advancing force which is applied from the restoring spring 18 to the activation rod 6 is also applied via the spherical head 15 to the fastening part 7 and likewise from the supporting ring 20 to the housing 2. The free axial distance S remains between the latching projection 8 and the stop 9.

Figure 5:
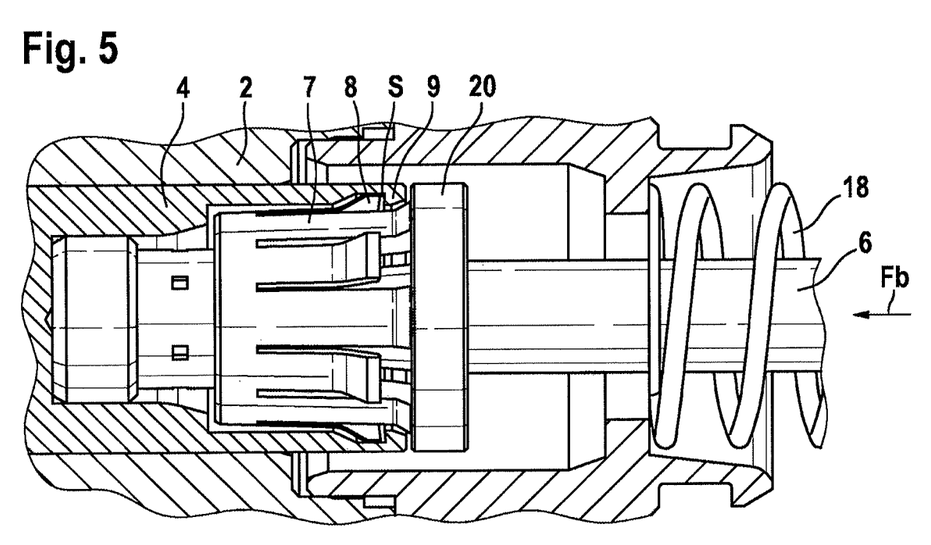

FIG. 5

When an activation process is carried out by means of the activation force Fb which is applied to the activation rod 6, the cylinder piston 4 is pressed in the direction of the pressure chamber 3 by the fastening part 7 and shifted axially, and in the process the restoring spring 18 is pre-stressed. The axial distance S between the latching projection 8 and the stop 9 is retained.

Figure 6A:
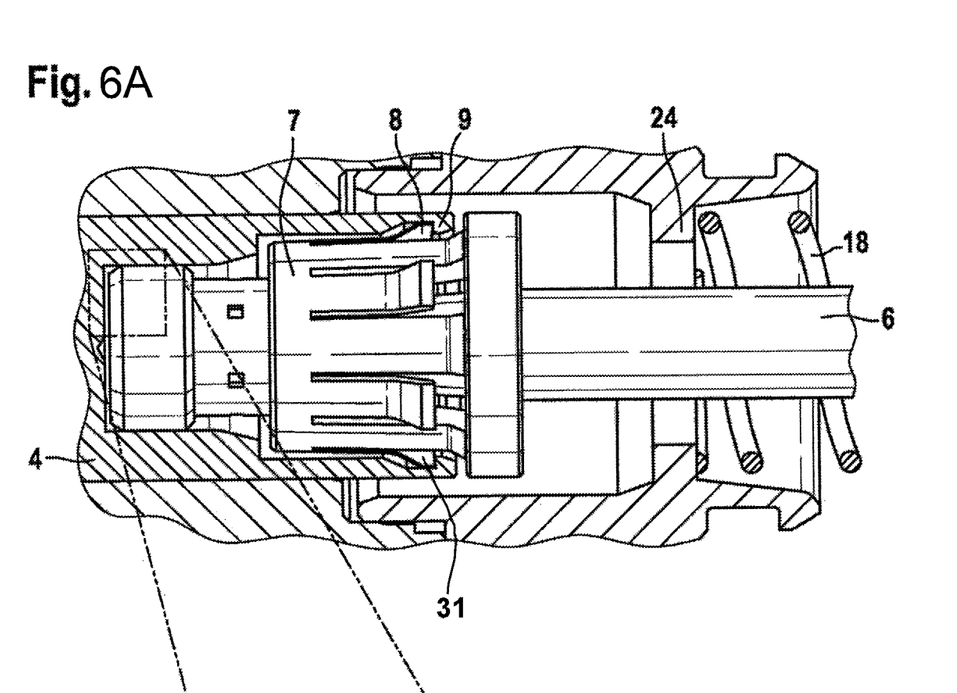
Figure 6B:
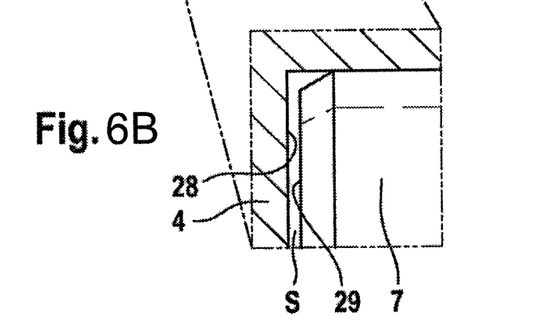

FIGS. 6A and 6B

After a braking process ends, during the return movement the activation force Fb is no longer applied to the activation rod 6. The latter is now pulled back by the prestressing force of the restoring spring 18. In the process, the latching projections 8 hook onto the stop 9, with the result that the cylinder piston 4 is entrained by the fastening part 7. The stop 9 at the same time presses against and slides on the sliding faces 33 of the clamping projections 31, causing a first resulting force component to load the clamping projection 31 radially inward and the advancing force Fv to be generated as a second force component which is orthogonal with respect to the first.

Figure 7:
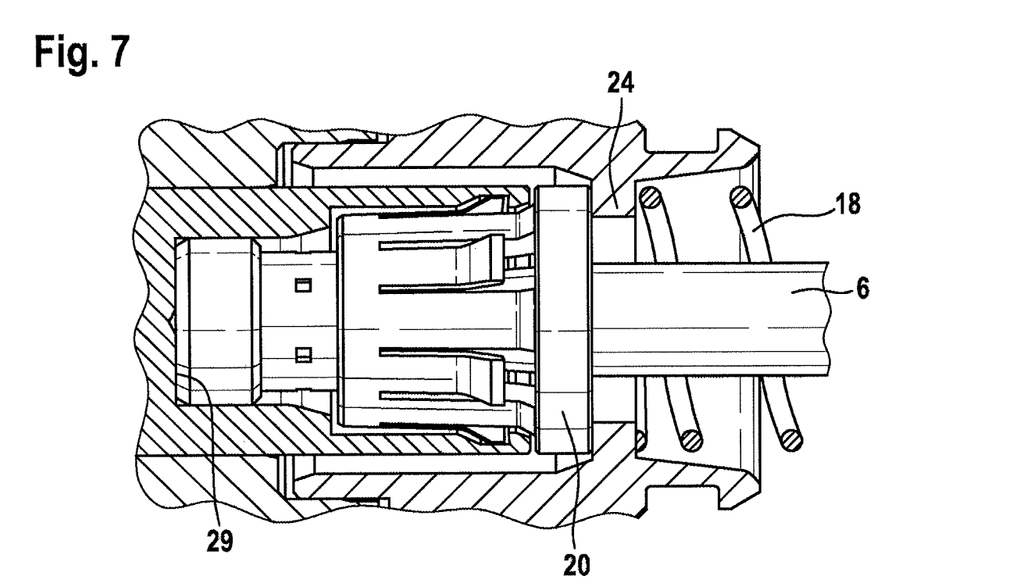

FIG. 7

As soon as the supporting ring 20 impacts against the supporting stop 24, the rearward movement of the activation rod 6 and of the fastening part 7 ends, with the result that the cylinder piston 4 is no longer pulled. However, the cylinder piston 4 is pushed back by the above-mentioned forces acting from the direction of the pressure chamber 3 on the cylinder piston 4 and in the process said cylinder piston 4 is shifted axially in relation to the fastening part 7 until there is contact between the cylinder piston 4 and the end side 29, and the home position according to FIG. 4 is restored.

Figure 8:
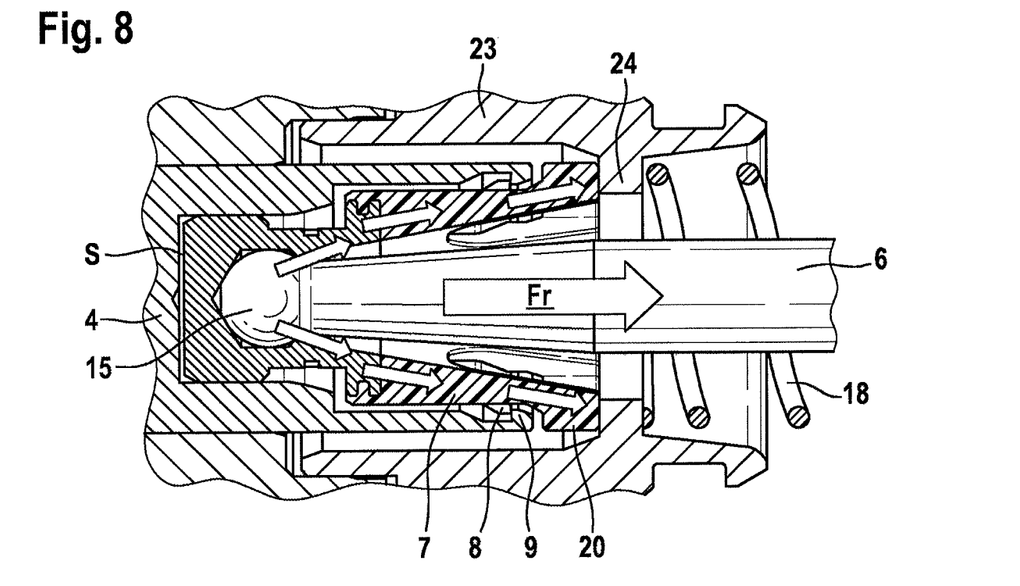
FIG. 8 shows a force profile for the abutment against the supporting stop.

FIG. 8

In FIG. 8, the force profile in the fastening part 7 at the end of a return movement according to FIG. 6, at the impacting against the supporting stop 24 is illustrated in a highly simplified fashion. The restoring force Fr acting from the restoring spring 18 on the activation rod 6 is applied from the spherical head 15 to the fastening part 7 and via the supporting ring 20 to the supporting stop 24, and the latching projections 8 and the clamping projections 31 bear on the stop 9.

Figure 9:
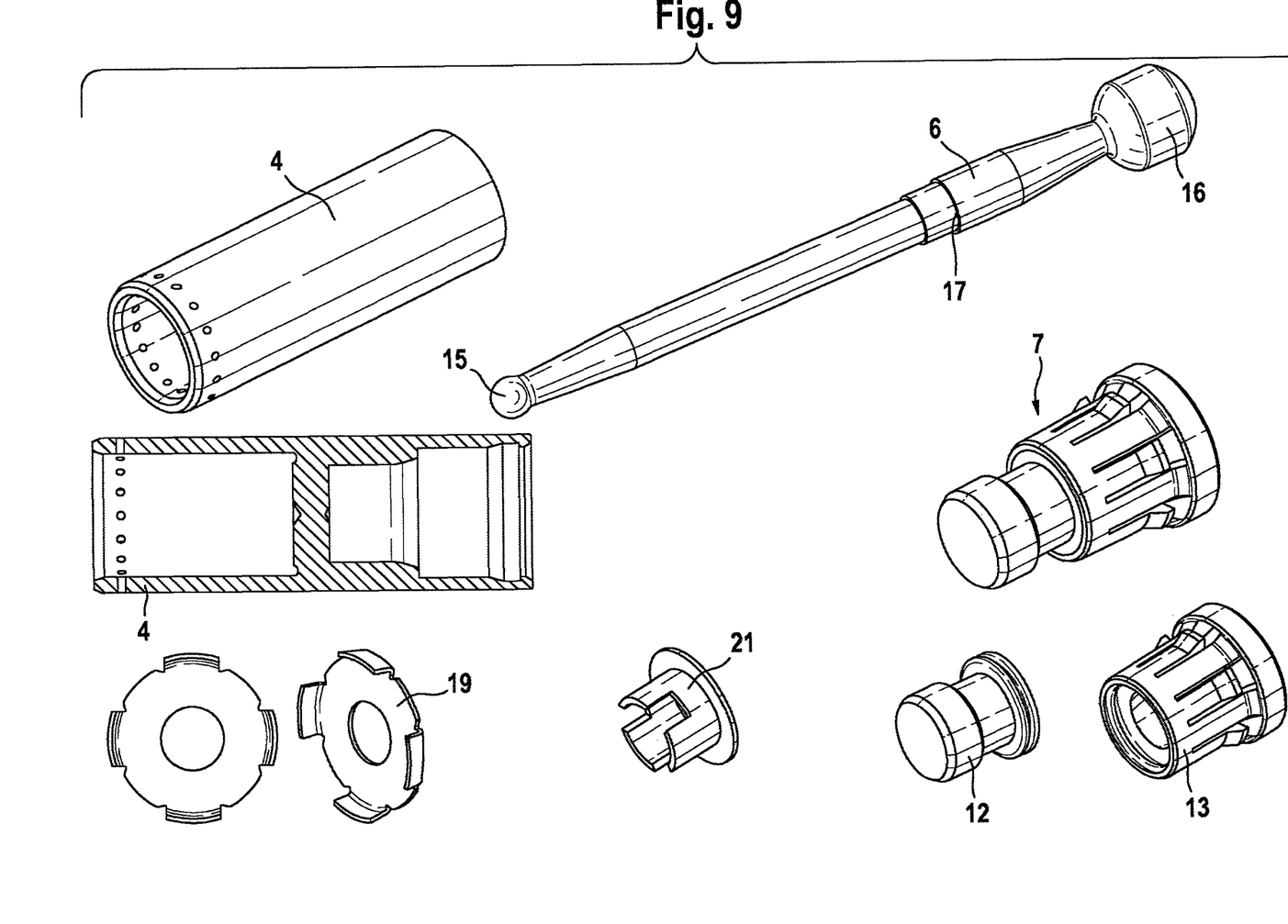
FIG. 9 is an overview of the cylinder piston and of a number of relevant components of the activation rod unit.

FIG. 9

In FIG. 9, a number of components and, in particular, the design of the support of the restoring spring 18 on the activation rod 6 are clarified. A radial shoulder 17 is formed on the activation rod 6. Instead of a radial shoulder, a flange or a disk which is inserted into a groove or a circlip can also be used within an aspect of the invention.

The restoring spring 18 is supported on a disk-shaped supporting element 19 which is preferably punched in a cost-effective fashion from sheet metal and is itself supported on the radial shoulder 17 with the intermediate positioning of a supporting sleeve 21. For simple assembly, the diameter of the radial shoulder 17 and appropriately the through-openings in the supporting element 19 and in the supporting sleeve 21 are selected to be larger than the front spherical head 15 of the activation rod 6.

Depending on the structural requirements within an aspect of the invention, the supporting sleeve 21 can be dispensed with, or the supporting sleeve 21 can be combined with the supporting element to form a single component.

LIST OF REFERENCE SIGNS

1 Brake device
2 Housing
3 Pressure chamber
4 Cylinder piston
5 Activation rod unit
6 Activation rod
7 Fastening part
8 Latching projection
9 Stop
10 End face
11 Undercut
12 Pressure part
13 Latching part
14 Spring arm
15 Spherical head
16 Spherical head
17 Radial shoulder
18 Restoring spring
19 Supporting element
20 Supporting ring
21 Supporting sleeve
22 Body
23 Rear part
24 Supporting stop
25 Fitting
26 Edge region
27 Connecting point
28 Blind drilled hole
29 End side
30 Rear edge
31 Clamping projection
32 Cut-in face
33 Sliding face
S Axial distance
Fb Actuating force
Fv Advancing force
Fr Restoring force

The invention claimed is:

1. A brake device for a hydraulic motor vehicle brake system, comprising:
    a housing, and
    at least one pressure chamber which is arranged in the housing,
    wherein the pressure chamber is bounded by at least one cylinder piston which can be moved in an axial direction,
    wherein the cylinder piston can be activated mechanically with an activation force by an activation rod unit,
    wherein the activation rod unit is secured to the cylinder piston by a latching connection,
    wherein the latching connection is brought about by an axial relative movement between the activation rod unit and the cylinder piston, and
    wherein the latching connection incorporates a free axial space that enables the activation rod unit which is latched to the cylinder piston to be moved to a limited degree in the axial direction relative to the cylinder piston.

2. The brake device as claimed in claim 1, wherein the activation rod unit has an activation rod to whose cylinder-piston-side end a separate fastening part, which is provided for transmitting force from the activation rod into the cylinder piston in both axial directions, is secured.

3. The brake device as claimed in claim 2, wherein the fastening part has at least one latching projection which interacts with an axial stop on the cylinder piston.

4. The brake device as claimed in claim 3, wherein the stop and the latching projection have corresponding contact faces which interact in such way that when there is axially directed pressure against the stop, a radially outwardly acting force is applied to the latching projection.

5. The brake device as claimed in claim 4, wherein an end face, axially facing the latching projection, of the stop is embodied in an oblique or rounded fashion such that the stop has a radial undercut.

6. The brake device as claimed in claim 3, wherein the fastening part is embodied in at least two pieces with a pressure part, which is provided for transmitting the activation force from the activation rod into the cylinder piston, and a latching part, which is connected to the pressure part and has at least one latching projection for latching in the cylinder piston.

7. The brake device as claimed in claim 6, wherein the latching part is constructed from a thermoplastic material.

8. The brake device as claimed in claim 3, wherein the fastening part has at least 3 latching projections arranged distributed over a circumference thereof.

9. The brake device as claimed in claim 3, wherein the latching projection is formed at a first free end of a spring arm whose second end is joined to the fastening part.

10. The brake device as claimed in claim 2, wherein the fastening part has at least one clamping projection with an oblique sliding face which, when abutment occurs against an axial stop of the cylinder piston in the fastening part, generates an advancing force directed in the direction of the activation force.

11. The brake device as claimed in claim 2, wherein in an unactivated home position the cylinder piston is supported axially against the housing by the fastening part.

12. The brake device as claimed in claim 2, wherein the fastening part has, at its end facing away from the cylinder piston, a supporting ring which is provided for applying axial forces from the cylinder piston into the housing.

13. The brake device as claimed in claim 2, wherein the activation rod is embodied in one piece and has a spherical head at each end.

14. The brake device as claimed in claim 2, wherein the activation rod has a radial shoulder, by which a restoring force which is generated in a restoring spring is applied to the activation rod in order to axially shift the activation rod unit into an unbraked home position.

15. The brake device as claimed in claim 14, wherein the restoring force is applied to the radial shoulder via a supporting element which is arranged guided in an axially movable fashion on the activation rod.

16. The brake device as claimed in claim 1, wherein the brake device for generating braking force interacts with at least one electromechanical or electrohydraulic booster stage or is integrated into the booster stage.

17. A brake device for a hydraulic motor vehicle brake system, comprising:
   a housing, and
   at least one pressure chamber which is arranged in the housing,
   wherein the pressure chamber is bounded by at least one cylinder piston which can be moved in an axial direction,
   wherein the cylinder piston can be activated mechanically with an activation force by an activation rod unit,
   wherein the activation rod unit is secured to the cylinder piston by a latching connection,
   wherein the latching connection is brought about by an axial relative movement between the activation rod unit and the cylinder piston,
   wherein the latching connection incorporates a free axial space that enables the activation rod unit which is latched to the cylinder piston to be moved to a limited degree in the axial direction relative to the cylinder piston,
   wherein the activation rod unit comprises an activation rod to whose cylinder-piston-side end a separate fastening part, which is provided for transmitting force from the activation rod into the cylinder piston in both axial directions, is secured,
   wherein the fastening part comprises at least one latching projection and at least one clamping projection, the at least one latching projection and the at least one clamping projection each interacting with an axial stop on the cylinder piston,
   wherein the axial stop and the at least one latching projection have corresponding contact faces which interact in such way that a radially outwardly acting force component is applied by the axial stop to the at least one latching projection, and
   wherein the axial stop and the at least one clamping projection have corresponding contact faces which interact in such way that a radially inwardly acting force component is applied by the axial stop to the at least one clamping projection.

* * * * *